United States Patent

[11] 3,597,601

[72] Inventor Herbert Bahring
Nieder-Ramstadt, Germany

[21] Appl. No. 795,156
[22] Filed Jan. 30, 1969
[45] Patented Aug. 3, 1971
[73] Assignee Fernseh GmbH
Darmstadt, Germany
[32] Priority Jan. 30, 1968
[33] Germany
[31] P 16 38 025.9

[54] ARRANGEMENT FOR GENERATING THE DERIVATIVE OF STEPPED VOLTAGE FUNCTION
7 Claims, 2 Drawing Figs.

[52] U.S. Cl. 235/183, 307/227, 328/127, 328/151
[51] Int. Cl. G06g 7/18
[50] Field of Search 235/183; 328/127, 151, 186; 333/19; 340/347 NT; 307/227

[56] References Cited

UNITED STATES PATENTS

| | | | |
|---|---|---|---|
| 2,947,480 | 8/1960 | Hirsch | 235/183 |
| 2,959,691 | 11/1960 | Zoerner et al. | 235/183 X |
| 3,287,640 | 11/1966 | Rehage | 235/183 X |
| 3,448,255 | 6/1969 | Murphy | 235/183 |

OTHER REFERENCES

Gulbenk et al.: How Modules Make Design Simple, Electronics Dec. 28, 1964 p. 50— 54

*Primary Examiner*—Malcolm A. Morrison
*Assistant Examiner*—Felix D. Gruber
*Attorney*—Michael S. Striker

ABSTRACT: A first sampling circuit samples an input voltage function at arbitrary time intervals. The sampling pulse has a short duration compared to the interval between successive samplings. The sample values are stored until the arrival of the next sample value. A resistor connected in series with a capacitor provides during each sampling a pulse-shaped voltage that is transferred to a second capacitor by means of a second sampling circuit working synchronously with the first. The transfer of charges is such that there appears across the latter capacitor a stepped voltage that is the derivative of the input voltage function.

Inventor:
Herbert Bähring
Michael S. Striker
Attorney

Inventor:
Herbert Bähring
Attorney

ARRANGEMENT FOR GENERATING THE DERIVATIVE OF STEPPED VOLTAGE FUNCTION

BACKGROUND OF THE INVENTION

In the electrical control technology, it is often necessary to obtain the first or higher derivative from a time function. Circuits are known in the art which perform this task with reasonable accuracy as demonstrated, for example, in the German Pat. No. 1,128,533. These conventional circuits are adapted to this purpose provided the functions to be processed are smooth functions. The conventional circuits, however, are not adapted to produce stepped or staircase functions of time derived from functions which are initially stepped or in the form of staircase timing functions. The application of circuitry for producing stepped functions derived from other stepped functions, may be for purposes of achieving a combined function consisting of the initial function and the derivative thereof. The realization of the derivative of a stepped function involves difficulties, since an infinitely high peak occurs theoretically when an ideal stepped signal changes levels. At the same time, a zero value is realized theoretically during the constant level of the step. Both of these signals, the infinitely high peak and the zero value are not technically usable.

The textbook "Digital Control" by Hans Fuchs, page 36, refers to means for obtaining the derivative from stepped voltages. The counter or register result is applied to one storage device and is then compared at the next measuring instant with the new counting or register state. With regard to differentiating a stepped curve, this implies that a comparison is performed between two stepped voltages of which one is stored. The difference between the two voltages in relation to the measuring instant or sampling interval, provides the derivative of the first curve as a function of time. The measuring and transformation procedure of this type requires considerable structural complexity in order that the process may be carried out.

In accordance with the present invention for the solution of the indicated problem, a resistor is connected in series with a storage capacitor of the sampling arrangement which samples the original voltage signal so as to obtain a stepped voltage. The latter is amplified and transferred to a further capacitor where it is stored until the next transfer of charge. The transfer of the amplified stepped voltage signal to this further capacitor occurs by way of a further electronic switching circuit which is controlled from the same pulse as the electronic switching circuit of the sampling arrangement which samples the original voltage signal. As a result of this design, the derivative of the original voltage signal is also in the form of a stepped or staircase function.

The present invention is based on the realization that the capacitor charge transfer current $\Delta i$ at each step is available for the purpose of aiding the generation of the derivative of the original voltage. This is based on the condition that the step function has a constant and limited width $\Delta T$, and that the voltage of the capacitor $C$ changes by this charge transfer during this step by the amount of the voltage $\Delta u$. The derivative of the voltage $u$ is then $$\frac{du}{dt}=\frac{\Delta u}{\Delta T}=\frac{1}{\Delta TC}\int_0^{\Delta T}\Delta i dt \qquad (1)$$

Thus, the information for obtaining the derivative of the stepped curve may be realized from the average value of the current $$\int_0^{\Delta T}\Delta i dt$$

which flows in the capacitor. The magnitude of the peak is also a measurement for the derivative of the voltage $u$.

SUMMARY OF THE INVENTION

An arrangement for generating the derivative of an input voltage function. The input voltage function is sampled and the values of the sampling process are stored in a capacitor which is connected to the sampling circuit. The sample value is thus stored within this capacitor until a subsequent sampling interval at which a new sample value is obtained from the sampling circuit. A resistor is connected in series with the capacitor and in the charging circuit thereof. As a result of the current flow associated with the capacitor, a pulse-shaped voltage appears across the resistor, representative of the capacitor current flow. The pulse-shaped voltage signal on this first capacitor is then transferred to a second or further capacitor through the application of a transfer circuit. The transfer circuit includes a transistorized amplifier and a switching circuit, the latter being controlled or actuated by the same timing signals which actuate the sampling circuit. Upon transfer of the pulse-shaped voltage signal to the second capacitor, a step-shaped output signal appears across the second capacitor, which is the derivative of the input voltage function. The sampling time duration $\Delta T$ is short compared to the sampled interval $T_0$, so that the sampling pulse duration is short compared to the duration of the sampling interval.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
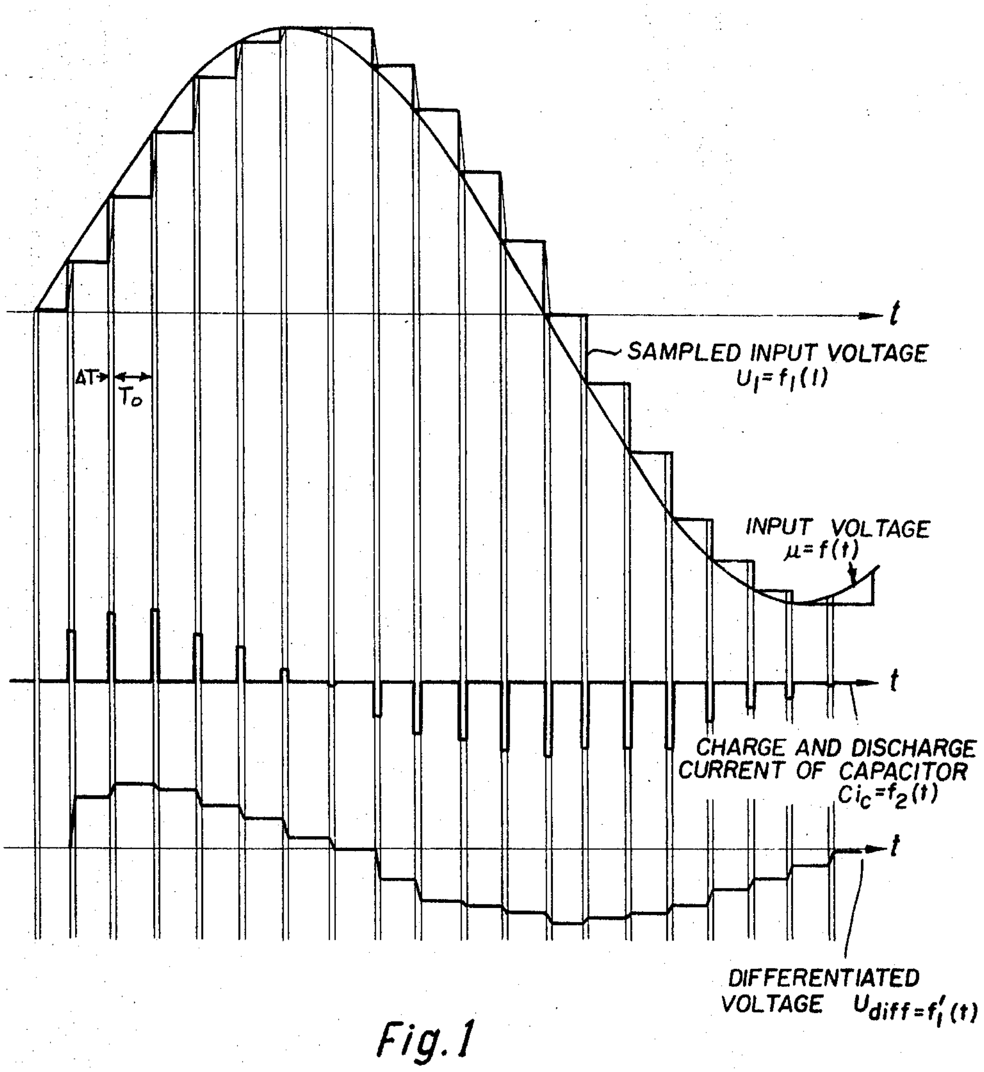
FIG. 1 is a graphical representation of the sampling process, as well as the differentiating process of a stepped voltage function, in accordance with the present invention.
Figure 2:
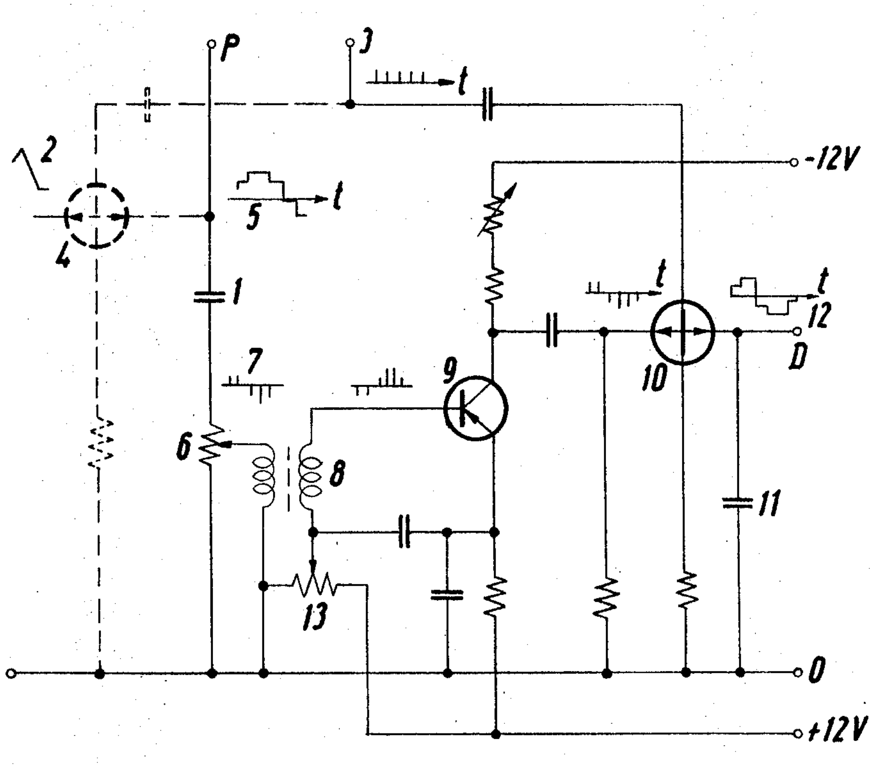
FIG. 2 is an electronic circuit diagram and shows the structural design and arrangement for carrying out the process of differentiating s stepped voltage function, in accordance with the present invention.

Referring to the drawing, FIG. 1 shows the graphical representation of the process, whereas FIG. 2 is an embodiment of the circuitry for carrying out the process, in accordance with the present invention. The curve $$u_1=f_1(t) \qquad 1.$$

is the step-shaped output voltage or staircase output which results from, for example, the short-period sampling of the input voltage function $$u=f(t) \qquad 2.$$

The sampling time interval is denoted by $\Delta T$, and the resulting pulse signals are stored in the capacitor 1 of FIG. 2, for the interval $T_o$. The charge and discharge current of the capacitor is given by $$i_c=f_2(t) \qquad 4.$$

This current is converted to a voltage through the resistor 6, and the resulting voltage becomes stored in a further capacitor 11 of a further electronic circuit. The stored voltage within the capacitor 11 is in the form of the differentiated voltage signal $$u\text{ diff}=f_3(t) \qquad 5.$$

Since the second electronic circuit is controlled from the same pulses 3 applied to the first electronic circuit, it is not required that the time intervals be constant. Only the duration $\Delta T$ of the controlled pulses must be identical or constant. This condition may be derived from the equation (I).

A voltage variation in relation to $\Delta T$ instead of the repetition period $T_0$, as in the conventional arrangement, results in a considerable increase in the sensitivity or accuracy $a$. This is due to the condition that $$a=1/\Delta T(fg) \qquad 6.$$

where $fg$ is the limiting frequency. As a result of the storage of the sampled signal within the capacitor until the next sampling instant, a phase shift occurs in relation to the output voltage. In order to maintain this error small, it is advantageous that the sampling frequency be high compared to the frequency of the sample signal voltage.

The differentiating circuit is shown in FIG. 2. An actual circuit has been designed with component values for a repetition frequency of 16 kHz. The proportional stepped or staircase voltage 5 results across the capacitor 1 and at the circuit point P through sampling of the voltage 2 by the electronic switch 4 controlled by pulses 3. Switch 4 preferably consists of a known field effect switching transistor, e.g. type BF246. This type conducts in both directions between source and drain, if a positive pulse is applied to the gate and the gate is connected to ground by a bias-resistor of at least 1 megohm. The stepped or staircase voltage 5 is to be differentiated through the differentiating circuit.

A resistor 6 is connected in series with the discharge capacitor 1. Voltage pulses 7 appear across this resistor, corresponding to the discharge current of the capacitor. Thus, the magnitude of these voltage pulses 7 is proportional to the charge and discharge current. The voltage pulses from the resistor 6 are reversed in polarity through the transformer 8 in which the primary winding of the transformer is connected to the resistor 6 which may be an adjustable resistor as shown in the drawing. After the pulses are thus reversed in polarity, they are amplified and again reversed by the transistorized amplifier 9 which is in a grounded emitter configuration by connecting the base, to the secondary winding of the transformer 8. The amplified pulses are transferred to the capacitor 11, by way of the electronic switching transistor 10 which is controlled by the same pulses 3 as the switching circuit 4. The capacitor 11 stores these pulses which are transferred to it. The resulting signal prevailing at the capacitor 11 and at the circuit point D is, thereby, in the form of the differentiated voltage signal 12 which is a stepped or staircase signal. The amplification of the signal applied to the amplifying stage 9 cannot be accomplished through a capacitively coupling connection because of the resulting time delay. A transformer of preferably large bandwidth is the most advantageous component for achieving this object.

The electronic switching circuits are best designed with the use of field-effect transistors of the type BF246, for example. These field-effect transistors are adapted best to performing the function of these electronic switches. The field-effect transistors allow current flow in both directions, and at the same time, they possess a large cutoff resistance such that the capacitor cannot discharge through them. The 100 ohm potentiometer 13 serves the purpose of setting the operating point of the transistorized amplifier to an optimum value. The control voltage applied to the electronic switching circuits must be matched to the storage voltages across the charging capacitors. This is accomplished or achieved through coupling capacitors and large resistors. This method of matching the control voltage corresponds to the conventional audion methods.

The use of the circuit for auxiliary purposes to realize PD or PID control in automatic control circuits is of advantage. Through such a design, optimum damping of hunting oscillations can be realized at the highest control speed or velocity. Also voltage variations can be well differentiated over half a second. The duration of the control pulses may amount to $2\times10^7$ second, corresponding to an interval period of $6\times10^{\prime\prime 15}$ second.

Thus, the capacitor 1 connected in series with the adjustable resistor 6, is also connected to the sampling switch 4. The adjustable contact of the resistor 6 is connected to one terminal of the primary winding of the transformer 8 which has a transformation ratio of unity. The other terminal of the primary winding leads to ground potential and to the resistor 13. The latter is also of the adjustable type and the sliding contact of this resistor 13 is connected to one terminal of the secondary winding of the transformer 8 and by way of a capacitor to the emitter of the transistor 9. The other terminal of the secondary winding is connected to the base of the transistor amplifier 9. The resistor 13 had one terminal connected to ground potential, whereas +12 volts are connected to the other terminal of this resistor 13. The emitter of the transistor 9 leads to the +12 volt power supply line, by way of the resistor 20, which is bypassed by a shunting capacitor. The collector of this transistor 9, on the other hand, leads to the −12 volt supply line through the collector resistor 22, which may be of the adjustable type. The collector of the transistor 9 is coupled to the field-effect electronic switching transistor 10, by way of a coupling capacitor 24. The circuit terminal D supplies the output signal of the circuit of the present invention. This circuit point D is capacitively coupled to ground, through the capacitor 11.

It will be understood that each of the elements described above, or two or more together, may also find a useful application in other types of constructions differing from the types described above.

While the invention has been illustrated and described as embodied in circuits for differentiating stepped voltage signals, it is not intended to be limited to the details shown, since various modifications and structural changes may be made without departing in any way from the spirit of the present invention.

What is claimed as new and desired to be protected by Letters Patent is set forth in the appended claims:

1. An arrangement for generating the derivative of an input voltage function, comprising, in combination, first sampling means for sampling values of said voltage function at arbitrary time intervals; a first capacitor connected to the output of said first sampling means for storing the sampled value of said input voltage until the next sampling instant when the next sampled value is obtained by said sampling means; resistor means connected between said first capacitor and a reference potential; second sampling means working synchronously with said first sampling means, the input of said second sampling means being connected to the junction between said first capacitor and said resistor means; and a second capacitor connected to the output of said second sampling means so that there appears across said second capacitor a stepped voltage that is the derivative of said input voltage function.

2. The arrangement for generating the derivative of an input voltage function as defined in claim 1, wherein said first and second sampling means are pulsed from the same source for pulsing said first and second sampling means with sampling pulses of constant duration.

3. The arrangement for generating the derivative of an input voltage function as defined in claim 2, wherein said sampling pulse duration is short compared to the interval between successive sampling pulses.

4. The arrangement for generating the derivative of an input voltage function as defined in claim 1, including amplifying means connecting the input of said second sampling means to said junction between said first capacitor and said resistor.

5. The arrangement for generating the derivative of an input voltage function as defined in claim 4, wherein said amplifying means includes transistor connected rounded emitter to obtain a low output impedance.

6. The arrangement for generating the derivative of an input voltage function as defined in claim 1, herein each of said first and second sampling means comprises field-effect transistor.

7. The arrangement for generating the derivative of an input voltage function as defined in claim 5, including coupling transformer means connected between the input of said amplifying means and said junction between said first capacitor and said resistor.